May 27, 1969  A. W. MACBETH  3,446,018
LINER FOR SOLID PROPELLANT ROCKET MOTOR
Filed Dec. 8, 1966  Sheet 1 of 2

INVENTOR.
ALBERT W. MACBETH
BY Edwin D. Grant

ATTORNEY

INVENTOR.
ALBERT W. MACBETH
BY Edwin D. Grant
ATTORNEY

# United States Patent Office 3,446,018
Patented May 27, 1969

3,446,018
LINER FOR SOLID PROPELLANT ROCKET MOTOR
Albert W. Macbeth, Brigham City, Utah, assignor to Thiokol Chemical Corporation, Bristol, Pa., a corporation of Delaware
Filed Dec. 8, 1966, Ser. No. 600,210
Int. Cl. F02k 9/04
U.S. Cl. 60—39.47     3 Claims

ABSTRACT OF THE DISCLOSURE

A solid propellant rocket motor casing is disclosed having an elastomeric liner covering substantially all of the inner surfaces thereof and bonded thereto along selected circumferentially extending bond areas, other interfacial areas of said casing and liner extending longitudinally from said bond areas being unbonded and thus free to more relative to each other.

---

This invention relates to rocket motors and more particularly to improved means for bonding solid propellant grains within rocket motor casings.

In the previously employed techniques and arrangements for bonding solid propellant grains within rocket motor casings, there have been no adequate provisions for limiting the stresses and strains induced in said grains by propellant shrinkage at low temperatures. Hence cracks develop in the grains of conventional solid propellant rocket motors exposed to low temperature environments, which cracks in turn produce unacceptable burning characteristics of the solid grains in which they occur. Furthermore, the polymeric material (or "liner") hereintofore employed to bond solid propellant grains to the wall of rocket motor casings has not provided an entirely satisfactory means for absorbing shear stress which occurs at the interface between a solid propellant grain and a rocket motor casing during the combustion of the grain.

Accordingly, it is a broad object of this invention to provide improved means for bonding a solid propellant grain, or a plurality of such grains, within a rocket motor casing.

Another object of this invention is to provide a rocket motor casing liner that eliminates the formation of cracks in solid propellant grains at low temperatures.

Still another object of this invention is to provide a rocket casing liner that permits displacement of a solid propellant grain longitudinally of a rocket motor casing and also in a direction normal to the inner surface of said rocket motor casing.

The above and other objects and advantages are achieved by embodiments of the invention each of which comprises a rocket motor casing having an elastomeric liner covering substantially all of the inner surface thereof and bonded thereto along at least one circumferentially extending bond area, interfacial surfaces of said casing and liner which extend longitudinally from said bond area being unbonded and thus free to move relative to each other. A clear understanding of the present invention can be gained by reading the following description of several preferred embodiments thereof, in which reference is made to the accompanying drawings wherein:

Throughout the specification and drawings, the same reference numbers refer to the same parts.

Figure 1:
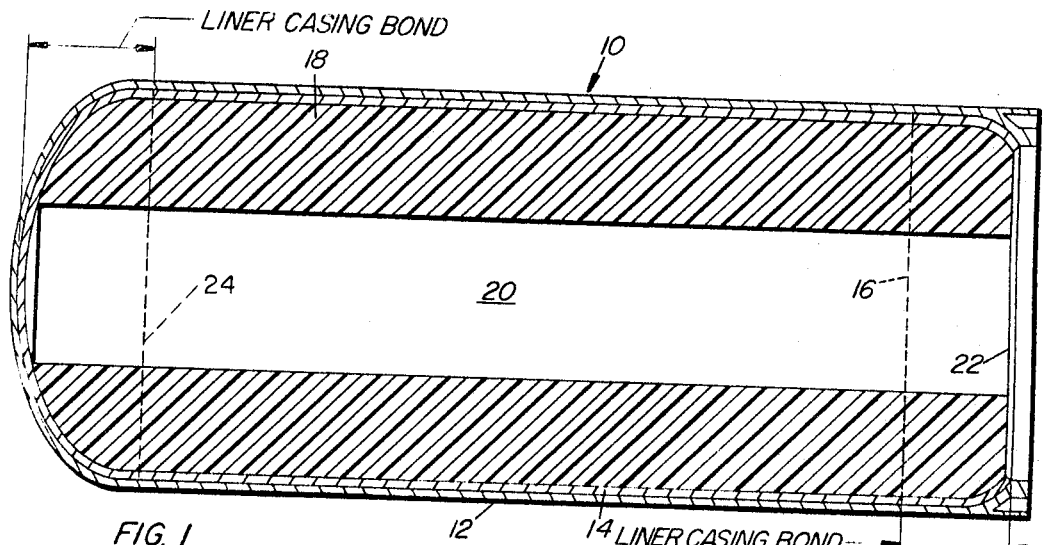
FIGURE 1 is a longitudinal sectional view of a preferred embodiment of the invention which utilizes a single perforated solid propellant grain having a relatively low web fraction.

In FIGURE 1 reference number 10 generally designates a rocket motor assembly comprising a tubular casing 12 having a closed forward end and an open aft end to which a thrust nozzle (not shown) can be attached by conventional mounting means. A liner 14 covers substantially all of the inner surface of casing 12 and is bonded thereto along a circumferentially extending liner-casing bond area the forward boundary of which is illustrated in the drawing by a broken line 16 and the aft boundary of which is at the aft end of said liner. Line 14 is also bonded to casing 12 at the inner surface of the forward end closure thereof (which bond area, for the purpose of interpretation of the claims, is to be understood as being within the definition of a "circumferentially extending liner-casing bond area"), the boundary of this bond area being represented by a broken line 24. Thus the interfacial surfaces of casing 12 and liner 14 which extend longitudinally between the aforementioned liner-casing bond areas are unbonded and free to move relative to each other.

The periphery of grain 18 is bonded to the inner surface of liner 14, and the aft end surface 22 of said grain is even with the aft end of said liner. It will be noted that grain 18 has a relatively low web fraction (web fraction being defined as the ratio of the distance between the inner and outer surfaces of the grain to its outside diameter).

Casing 12 of the described embodiment of the invention is formed of a steel or other suitable high strength material, and grain 18 consists of a solid propellant composition comprising an oxidizer interspersed in a fuel matrix. Liner 14 is an elastomeric material such as the following composition (expressed in weight percent):

| | Percent |
|---|---|
| Carboxyl-terminated polybutadiene polymer | 83.0 |
| Tris [1-(2-methyl)aziridinyl] phosphine oxide | 2.4 |
| Trifunctional epoxy resin | 1.6 |
| Asbestos floats | 10.0 |
| Iron octoate | 1.0 |
| Triglyceride of hydroxy stearic acid | 2.0 |

Although various procedures can be followed in manufacturing the rocket motor assembly 10, it has been found advantageous to initially coat the inner surface of casing 12 with tetrafluoroethylene, which can be applied by conventional spray techniques, and then to sandblast the area of said inner surface to which liner 14 is to be bonded. Liner 14 can then be applied to the inner surface of casing 12, cured in situ, and grain 18 thereafter cast within, and bonded to, said liner by means of conventional manufacturing processes that are well-known in the art. Liner 14 will thus form strong bonds with casing 12 at the aforedescribed liner-casing bond areas and with the peripheral surface of grain 18, whereas the interfacial surfaces of said casing and liner between said liner-casing bond areas remain unbonded because of the tetrafluoroethylene coating disposed therebetween.

As will be readily understood from the introductory discussion presented hereinbefore, exposure of rocket motor assembly 10 to a low temperature environment will cause grain 18 to shrink. If the periphery of grain 18 were bonded to casing 12 over the entire inner surface of the latter, as is the case where a liner is applied to a rocket motor casing by conventional grain casting techniques, shrinkage of the grain would be accompanied by the formation of cracks at different points along the surfaces thereof. However, since the outer surface of liner 14 is bonded to casing 12 only along the circumferentially extending liner-casing bond areas at the aft and forward ends of said liner, as grain 18 shrinks the liner 14 bonded to said grain moves away from the wall of casing 12 at the interfacial surfaces of said casing and liner between the liner-casing bond areas. Consequently, the stress induced in grain 18 at a particular low temperature is not as great as that induced in a solid propellant grain that is bonded to a rocket motor casing over its entire peripheral surface.

Figure 2:
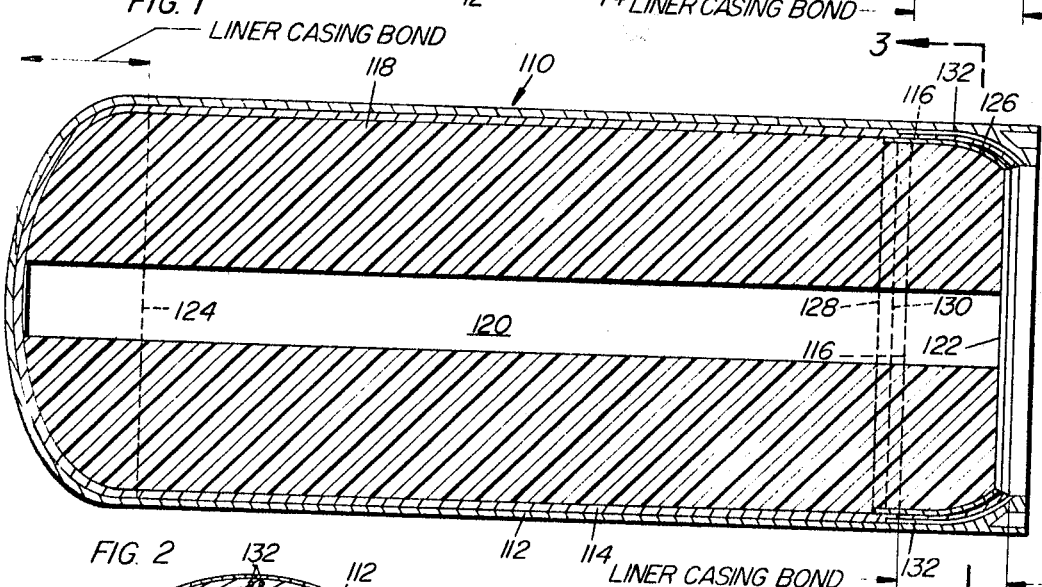
FIGURE 2 is a longitudinal sectional view of a second preferred embodiment of the invention which utilizes a single perforated solid propellant grain having a higher web fraction than the grain illustrated in FIGURE 1.
Figure 3:
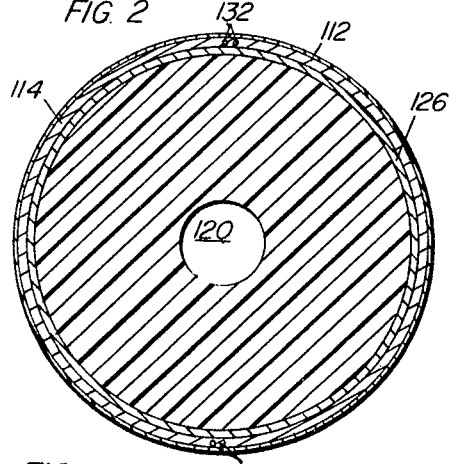
FIGURE 3 is a cross sectional view of the embodiment illustrated in FIGURE 2, taken along the plane represented by line 33 in that drawing.

Although the above-described embodiment of the invention can advantageously be employed in conjunction with perforated solid propellant grains having a low web fraction, the embodiment illustrated in FIGURES 2 and 3 is preferred for a perforated grain having a web fraction above about 40% and for a single unperforated grain. This second rocket motor assembly 110 comprises a casing 112, liner 114 and perforated solid propellant grain 118, all of which have the same function as corresponding parts illustrated in FIGURE 1 and described in the preceding specification of the rocket motor assembly pictured therein. Liner 114 is bonded to the inner surface of casing 112 along a circumferentially extending liner-casing bond area disposed at the aft end of said casing, the forward boundary of said liner-casing bond area being illustrated in the drawing by a broken line 116, and the liner is also bonded to the inner surface of the forward end closure of casing 112 along a second circumferentially extending liner-casing bond area the boundary of which is illustrated by a broken line 124.

The second embodiment differs from the rocket motor assembly of FIGURE 1 in that a "split-flap" or band 126 is disposed around grain 118 and bonded at its inner surface to the periphery thereof, the aft end of said band being substantially coterminous with the aft end surface 122 of said grain and the forward end of said band being bonded to liner 114 along a circumferentially extending liner-band area the forward boundary 128 of which is at the forward edge of said band and the aft boundary 130 of which is spaced forward of the forward boundary 116 of the liner-casing bond area. Band 126 is formed of an elastomeric material and the portion of its outer surface that is not bonded to liner 114 abuts the inner surface of said liner at the time the rocket motor assembly is manufactured. The second embodiment of the invention is also provided with four conduits 132 (see FIGURE 3) each disposed against the inner surface of casing 112 and extending through the aforedescribed liner-casing bond area. More particularly, pairs of the conduits 132 are diametrically opposed relative to casing 112 and each conduit extends from the aft end of liner 114 to a point forward of the forward boundary 116 of the liner-casing bond area. Thus the conduits communicatively connect the exterior of casing 112 with the unbonded interfacial surfaces of said casing and liner which extend forward from said liner-casing bond area. Conduits 132 may be formed of a suitable metal or plastic.

When the rocket motor assembly illustrated in FIGURES 2 and 3 is exposed to a low temperature environment, a gap appears between the unbonded interfacial surfaces of casing 112 and liner 114 between the casing-liner bond areas, thus minimizing thermal stresses in grain 118 as described hereinbefore in the explanation of the operation of the first embodiment of FIGURE 1. However, because the web fraction of grain 118 of the second embodiment of the invention is considerably higher than that of grain 18 of the first embodiment, band 126 is placed on the aft end of said grain 118 as an additional means to reduce the possibility of crack formation in the solid propellant. As illustrated in FIGURE 2, shrinkage of grain 118 at low temperatures results in separation of the unbonded portion of the outer surface of band 126 from the adjacent inner surface of liner 114, which relieves stress that would occur in the aft end of grain 118 if its peripheral surface were fixedly bonded to liner 114 at this portion of the grain. Both the perforation 120 of grain 118 and the unbonded interfacial surfaces of casing 112 and liner 114 between the liner-casing bond areas are communicatively connected to the exterior of said casing through the thrust nozzle (not shown) mounted on aft end of casing 112, the interfacial surfaces of said casing and liner being so connected by means of conduits 132. Therefore, during storage of the rocket motor assembly 110 the pressure on the wall of perforation 120 of grain 118 remains equal to the pressure in the gap formed between the unbonded interfacial surfaces of casing 112 and liner 114 as a result of exposure of the rocket motor assembly 110 to a low temperature environment, thereby preventing any restriction of the movement of grain 118 and liner 114 bonded thereto away from the inner surface of casing 112 such as could perhaps result from a pressure differential across the web of grain 118. Another advantage of the arrangement of components of the rocket motor assembly of FIGURES 2 and 3 is that the spacing between the liner-band area, described hereinbefore, tends to minimize shear stresses at the periphery of grain 118 which occur when the grain is ignited and casing 112 is thereby pressurized. As grain 118 is formed of a viscoelastic material, its rigidity is pressure dependent and thus after casing 112 is pressurized the aft end portion of the grain moves forward. The shear stress at the periphery of grain 118 which results from this forward movement of the aft portion of said grain is at least partially absorbed by the unbonded portion of liner 114 disposed between the aft liner-casing bond area and the liner-band (split flap) area.

Figure 4:
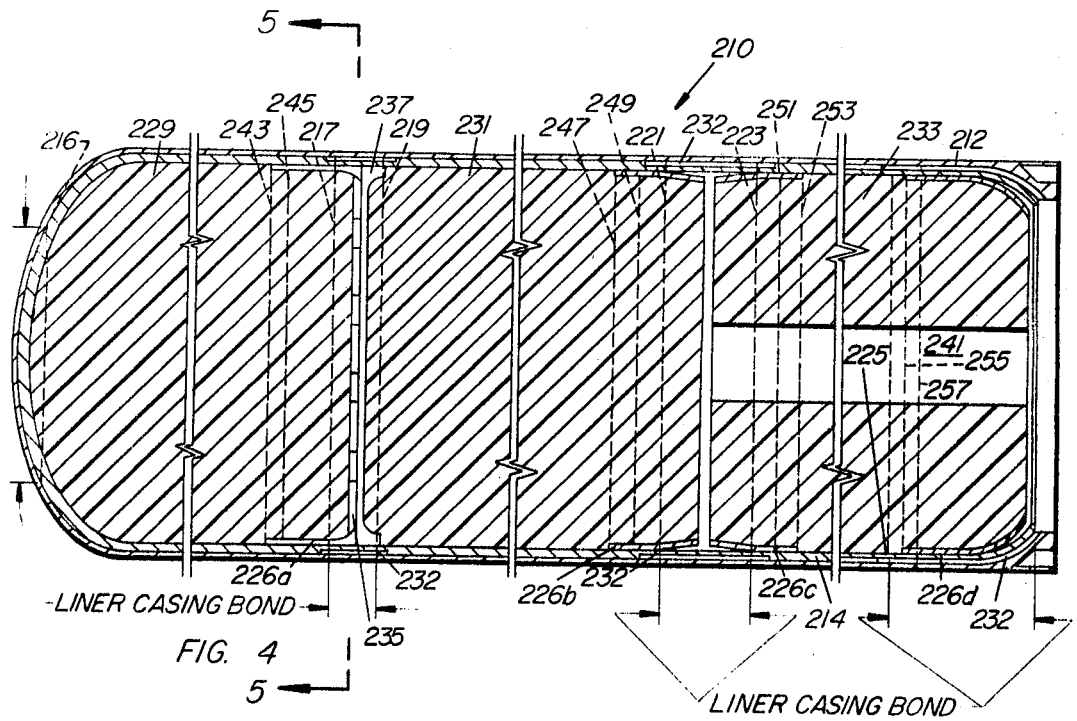
FIGURE 4 is a longitudinal sectional view of a third preferred embodiment of the invention which utilizes one perforated solid propellant grain and two end burning solid propellant grains.
Figure 5:
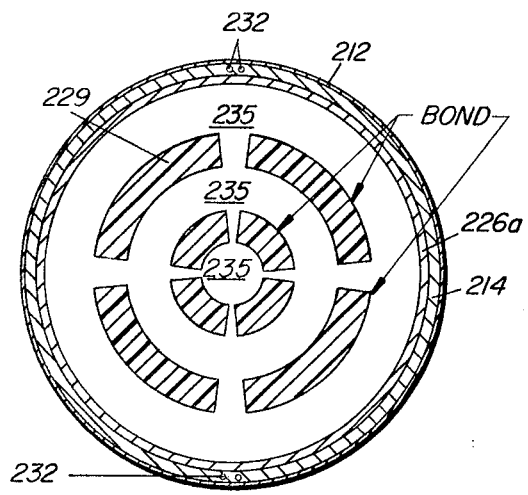
FIGURE 5 is a cross sectional view of the embodiment illustrated in FIGURE 4, taken along the plane represented by line 5—5 in that drawing.

Illustrated in FIGURES 4 and 5 is a rocket motor assembly 210 comprising a tubular casing 212 having an elastomeric liner 214 covering substantially all of the inner surface thereof. Liner 214 is bonded to the inner surface of casing 212 along first, second, third and fourth circumferentially extending liner-casing bond areas that are spaced apart longitudinally of said casing. More particularly, said first liner-casing bond area is a circular area on the forward end closure of casing 212 (for the purpose of interpretation of claims appended hereto, this circular area is to be understood as being within the definition of a "circumferentially extending liner-casing bond area"), the boundary of which area is illustrated in FIGURE 4 by a broken line 216. The forward and aft boundaries of said second liner-casing bond area are illustrated by broken lines 217, 219 respectively; the forward and aft boundaries of said third liner-casing bond area are illustrated by broken lines 221, 223 respectively; and the forward boundary of said fourth liner-casing bond area is illustrated by a broken line 225, with the aft boundary thereof being at the aft end of liner 214.

Rocket motor assembly 210 is provided with first, second and third solid propellant grains 229, 231, 233 which are tandemly disposed within liner 214 and respectively bonded at their peripheries to the inner surface thereof (the forward end and the periphery of said first grain 229 are bonded to said liner). As can be seen in FIGURE 5, the aft end surface of first grain 229 has a plurality of recesses formed therein, these recesses being filled with an igniter material 235. Disposed between first grain 229 and second grain 231 is an incombustible, frangible barrier 237 the peripheral edge of which is bonded to liner 214. The aft end surface of grain 229 and the forward end surface of grain 231 are also respectively bonded to the opposite faces of barrier 237. Third grain 233 has a perforation 241 extending longitudinally therethrough, the aft end surface of said grain being substantially coterminous with the aft end of liner 214 and the forward end surface thereof being spaced from the aft end surface of grain 231.

Extending around the aft portion of grain 229 is a first elastomeric band 226a the inner surface of which is bonded to the periphery of said grain. The aft end of band 226a abuts the forward end surface of barrier 237, and the forward end of said band is bonded to liner 214 along a circumferentially extending liner-band bond area the forward boundary 243 of which is at the forward end of said band and the aft boundary 245 of which is spaced forward of the forward boundary 217 of the aforedescribed second liner-casing bond area. A second elastomeric band 226b is disposed in the same manner on the aft portion of grain 231, with the forward boundary of the circumferentially-extending bond area between said band and liner 214 being illustrated in FIGURE 4 by a broken line 247 and the aft boundary of said bond area being illustrated by broken line 249. It will be noted that the aft boundary of the bond area between band 226b and liner 214 is also longitudinally spaced forward of the adjacent, or third, liner-casing bond area. At opposite ends of grain 233 are respectively disposed third and fourth elastomeric bands 226c, 226d, the boundaries of the circumferentially extending bond areas between these bands and liner 214 being illustrated by the broken lines 251, 253, 255, 257. As described hereinbefore, the bond areas between liner 214 and the bands (or splitflaps) 226a, 226b on grains 229, 231, respectively, are longitudinally spaced from the adjacent bond areas between said liner and casing 212. This arrangement of the band-liner and liner-casing bond areas has been found advantageous where split-flaps are used with a grain having no central perforation (such as grains 229 and 231 of FIGURE 4) or having a central perforation and one end burning surface (such as grain 118 of FIGURE 2), since stresses that tend to destroy the band-liner and liner-casing bonds are minimized thereby. However, where split-flaps are used with a grain having a central perforation and two end burning surfaces, such as grain 233, there is little or no resultant force on the grain, during its combustion, that tends to move it longitudinally of the casing to which it is bonded. Consequently in the case of a perforated, double end burning grain, a band-liner bond can coincide with a band-liner bond (as in the illustrated relation between the band 226d-liner 214 bond area and the liner 214-casing 212 bond area at the aft end of casing 214), or alternatively a band-liner bond can be longitudinally spaced from an adjacent liner-casing bond (as in the illustrated relation between the band 226c-liner 214 bond area and the liner 214-casing 212 bond area immediately forward of the rearmost liner-casing bond area).

Rocket motor assembly 210 is also provided with a plurality of conduits 232 disposed in groups of four at the second, third and fourth liner-casing bond areas and communicatively connecting the exterior of casing 212 with each of the unbonded interfacial surfaces of said casing and liner 214 which extend between the liner-casing bond areas.

The arrangement of the bond areas between casing 212 and liner 214 and the bond areas between bands 226a, 226b, 226c, 226d and said liner permits shrinkage of grains 229, 231, 233 with minimal tendency to crack formation in the latter, as should be readily apparent from the foregoing description of the first and second embodiments of the invention which are designed in accordance with the same principles. It will also be recognized that conduits 232 of the third embodiment has the same function as conduits 132 of the second embodiment, namely, to equalize the pressure on unbonded, longitudinally extending surface of liner 214 with the pressure on the other surfaces of the grains 229, 231, 233 to which said liner is bonded along its inner surface.

Upon ignition of grain 233, rocket motor assembly 210 produces a high initial boost thrust that decays to a lower level sustain thrust as both grain 233 and grain 231 are consumed. Motor operation is halted by barrier 237 when grain 231 has been completely burned. Subsequently igniter material 235 in the recesses in the aft end surface of grain 229 can be ignited by conventional means, such as squibs (not shown) embedded in said igniter material and connected to a source of electric current, whereupon grain 229 is ignited and the gas generated by the combustion thereof destroys the frangible barrier 237. Thus the rocket motor assembly 210 provides a second thrust period that can be initiated when desired.

The interface bonding between barrier 237 and the aft end surface of grain 229 and the forward end surface of grain 231 limits shrinkage (as a result of exposure of rocket motor assembly 210 to a low temperature environment) at the grain-barrier interface. Hence shrinkage of grains 229, 231 occurs mainly at the peripheries thereof, where displacement of the grains relative to casing 212 is accommodated by the arrangement of the bond areas between said casing and liner 214. For a long end burning grain with high acceleration, some of the forward periphery of liner 214, as well as that portion of said liner abutting the forward end closure of casing 212, preferably is bonded to said casing to resist axially applied stresses resulting from the acceleration of rocket motor assembly 210.

Because of the design features disclosed in the foregoing description, the invention provides effective means for minimizing thermally induced stresses in solid propellant grains of rocket motors. This needed improvement in rocket motor design can be attained by various embodiments of the invention without adversely affecting the volume of solid propellant that can be placed within rocket motor casings of a given size. Furthermore, as will be apparent from a consideration of the different rocket motor assemblies disclosed herein, the invention is adapted for use in either single thrust period or multiple thrust period solid propellant rocket motors, with little or no change in the basic structure of a rocket motor.

What is claimed is:
1. In a rocket motor, the combination comprising:
   a casing;
   an elastomeric liner covering substantially all of the inner surface of said casing and bonded thereto along at least one circumferentially extending liner-casing bond area, interfacial surfaces of said casing and liner which extend longitudinally from said liner-casing bond area being unbonded;
   at least one solid propellant grain bonded at its periphery to the inner surface of said liner, said liner-casing bond area being disposed at one end of said grain; and
   at least one elastomeric band disposed around said grain and bonded at its inner surface to the periphery thereof, one end of said band being substantially coterminous with an end surface of said grain and the other end of said band being bonded to said liner along a circumferentially extending liner-band bond area.
2. The combination defined in claim 1 including conduit means on said casing for communicatively connecting the exterior of said casing with said unbonded interfacial surfaces of said casing and liner.
3. In a rocket motor, the combination comprising:
   a tubular casing having a closed forward end and an open aft end;
   an elastomeric liner covering substantially all of the inner surface of said casing and bonded thereto along first, second, third and fourth circumferentially extending liner-casing bond areas that are spaced apart longitudinally of said casing, interfacial surfaces of said casing and liner which extend longitudinally be- tween said liner-casing bond areas being unbonded, said first liner-casing bond area being at the forward end of said casing and said fourth liner-casing bond area extending forward from the aft end of said liner;

first, second and third solid propellant grains tandemly disposed within said liner and respectively bonded at their peripheries to the inner surface thereof, adjacent end surfaces of said grains being spaced apart, said first grain being disposed at the forward end of said casing and the aft end surface thereof having at least one recess formed therein, said third grain having a perforation extending longitudinally therethrough and the aft end surface thereof being substantially coterminous with the aft end of said liner;

first, second, third, and fourth elastomeric bands disposed within said liner and extending circumferentially thereof, said first band being bonded at its inner surface to the periphery of said first grain, the aft end of said first band being substantially coterminous with the aft end surfaces of said first grain and the forward end of said first band being bonded to said liner along a circumferentially extending liner-band bond area that is longitudinally spaced forward of said second liner-casing bond area, said second band being bonded at its inner surface to the periphery of said second grain, the aft end of said second band being substantially coterminous with the aft end surface of said second grain and the forward end of said second band being bonded to said liner along a circumferentially extending liner-band bond area that is longitudinally spaced forward of said third liner-casing bond area, said third band being bonded at its inner surface to the periphery of said third grain, the forward end of said third band being substantially coterminous with the forward end surface of said third grain and the aft end of said third band being bonded to said liner, said fourth band being bonded at its inner surface to the periphery of said third grain, the aft end of said fourth band being substantially coterminous with the aft end surface of said third grain and the forward end of said band being bonded to said liner;

conduit means on said casing for communicatively connecting the exterior of said casing with said unbonded interfacial surfaces of said casing and liner;

an incombustible, frangible barrier disposed between and bonded to the aft end surface of said first grain and the forward end surface of said second grain, the peripheral edge of said barrier being bonded to said liner;

pyrotechnic means disposed within said recess in the aft end surface of said first grain for igniting said first grain and thereby perforating said barrier at a predetermined time.

References Cited

UNITED STATES PATENTS

| | | | |
|---|---|---|---|
| 3,032,975 | 5/1962 | Alden | 60—255 |
| 3,108,433 | 10/1963 | De Fries et al. | 60—255 |
| 3,173,253 | 3/1965 | Elias | 60—255 |
| 3,243,956 | 4/1966 | Hamm et al. | 60—255 |
| 3,316,718 | 5/1967 | Webb | 102—103 XR |

CARLTON R. CROYLE, Primary Examiner.

U.S. Cl. X.R.

60—255; 102—103